US012619625B2

(12) United States Patent
Janyavula et al.

(10) Patent No.: US 12,619,625 B2
(45) Date of Patent: *May 5, 2026

(54) SYSTEM FOR PERFORMING DATA TRANSFORMATIONS USING A SET OF INDEPENDENT SOFTWARE COMPONENTS

(71) Applicant: Capital One Services, LLC, McLean, VA (US)

(72) Inventors: Meher Ram Janyavula, Frisco, TX (US); Arunkumar Rajappan, Dallas, TX (US); Muralikumar Venkatasubramaniam, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 118 days.

This patent is subject to a terminal disclaimer.

(21) Appl. No.: 16/713,663

(22) Filed: Dec. 13, 2019

(65) Prior Publication Data

US 2020/0117677 A1 Apr. 16, 2020

Related U.S. Application Data

(63) Continuation of application No. 16/109,106, filed on Aug. 22, 2018, now Pat. No. 10,552,440.

(51) Int. Cl.
| | |
|---|---|
| *G06F 16/25* | (2019.01) |
| *G06F 16/174* | (2019.01) |
| *G06F 16/23* | (2019.01) |
| *G06F 16/2455* | (2019.01) |

(52) U.S. Cl.
CPC ........ *G06F 16/254* (2019.01); *G06F 16/1748* (2019.01); *G06F 16/2379* (2019.01); *G06F 16/2456* (2019.01); *G06F 16/258* (2019.01)

(58) Field of Classification Search
CPC .. G06F 16/254; G06F 16/258; G06F 16/2379; G06F 16/2456; G06F 16/1748
See application file for complete search history.

(56) References Cited

U.S. PATENT DOCUMENTS

| | | |
|---|---|---|
| 6,501,950 B1 | 12/2002 | Smith et al. |
| 7,051,334 B1 | 5/2006 | Porter et al. |
| 7,058,615 B2 | 6/2006 | Yao |

(Continued)

OTHER PUBLICATIONS

Wikipedia, pandas (software), https://web.archive.org/web/20170623032331/https://en.wikipedia.org/wiki/Pandas_(software), Jun. 23, 2017, 3 pp. (Year: 2017).*

*Primary Examiner* — Marc S Somers
(74) *Attorney, Agent, or Firm* — GREENBERG TRAURIG, LLP

(57) ABSTRACT

Described is a system (and method) that provides a framework for performing data transformations, which may be part of an Extract, Transform, and Load (ETL) process. The system may perform a data transformation by creating a pipeline that executes a set of independent software components (or component, plugins, add-ons, etc.). The components may be executed as individual services (e.g., microservices) that may be provided within containers to allow the components to be deployed as self-contained units on various types of host systems including cloud-based infrastructures. In addition, to provide further flexibility for the framework, the components may be implemented using preexisting software libraries.

20 Claims, 7 Drawing Sheets

(56)  References Cited

U.S. PATENT DOCUMENTS

| | | | |
|---|---|---|---|
| 7,849,049 B2 | 12/2010 | Langseth et al. | |
| 9,268,828 B2 | 2/2016 | Rausch et al. | |
| 9,626,416 B2 | 4/2017 | Li et al. | |
| 9,727,604 B2 | 8/2017 | Jin et al. | |
| 2005/0278152 A1* | 12/2005 | Blaszczak | G06F 16/283 |
| | | | 703/1 |
| 2007/0179959 A1* | 8/2007 | Sharma | G06N 5/003 |
| 2008/0092112 A1 | 4/2008 | Jin et al. | |
| 2008/0168082 A1* | 7/2008 | Jin | G06F 8/20 |
| 2011/0060719 A1 | 3/2011 | Kapoor | |
| 2016/0127199 A1* | 5/2016 | Ding | H04L 67/02 |
| | | | 709/226 |
| 2017/0060695 A1* | 3/2017 | Clare | G06F 3/065 |
| 2017/0111241 A1 | 4/2017 | Degioanni | |
| 2018/0069925 A1* | 3/2018 | Lavasani | G06F 16/28 |
| 2018/0088935 A1* | 3/2018 | Church | G06F 11/3051 |
| 2018/0150528 A1* | 5/2018 | Shah | G06F 16/254 |
| 2019/0095599 A1* | 3/2019 | Iliofotou | G06F 21/316 |

* cited by examiner

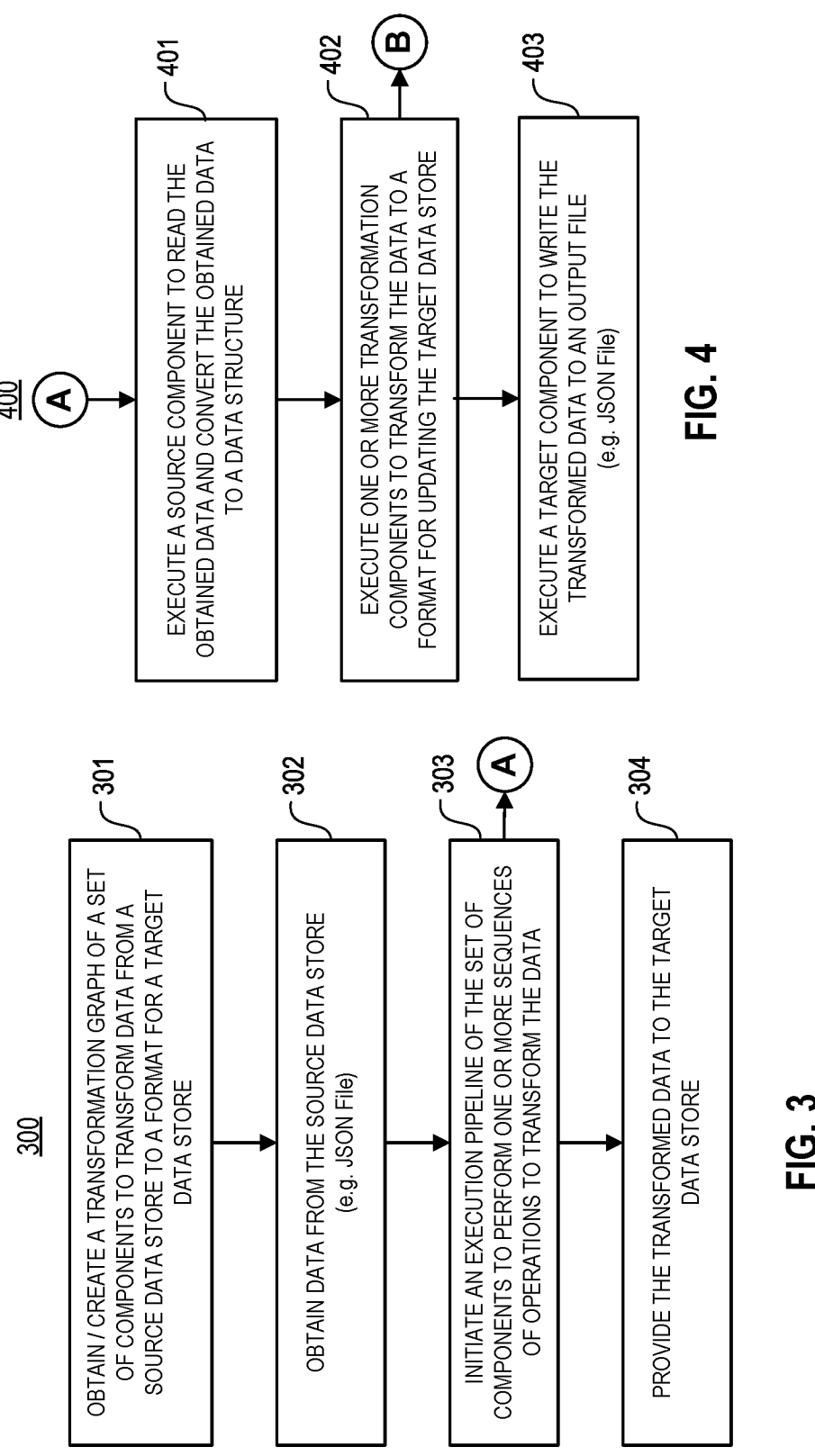

400

Ⓐ

401 — EXECUTE A SOURCE COMPONENT TO READ THE OBTAINED DATA AND CONVERT THE OBTAINED DATA TO A DATA STRUCTURE

402 — EXECUTE ONE OR MORE TRANSFORMATION COMPONENTS TO TRANSFORM THE DATA TO A FORMAT FOR UPDATING THE TARGET DATA STORE

Ⓑ

403 — EXECUTE A TARGET COMPONENT TO WRITE THE TRANSFORMED DATA TO AN OUTPUT FILE (e.g. JSON File)

301 — OBTAIN / CREATE A TRANSFORMATION GRAPH OF A SET OF COMPONENTS TO TRANSFORM DATA FROM A SOURCE DATA STORE TO A FORMAT FOR A TARGET DATA STORE

302 — OBTAIN DATA FROM THE SOURCE DATA STORE (e.g. JSON File)

303 — INITIATE AN EXECUTION PIPELINE OF THE SET OF COMPONENTS TO PERFORM ONE OR MORE SEQUENCES OF OPERATIONS TO TRANSFORM THE DATA

Ⓐ

304 — PROVIDE THE TRANSFORMED DATA TO THE TARGET DATA STORE

FIG. 3

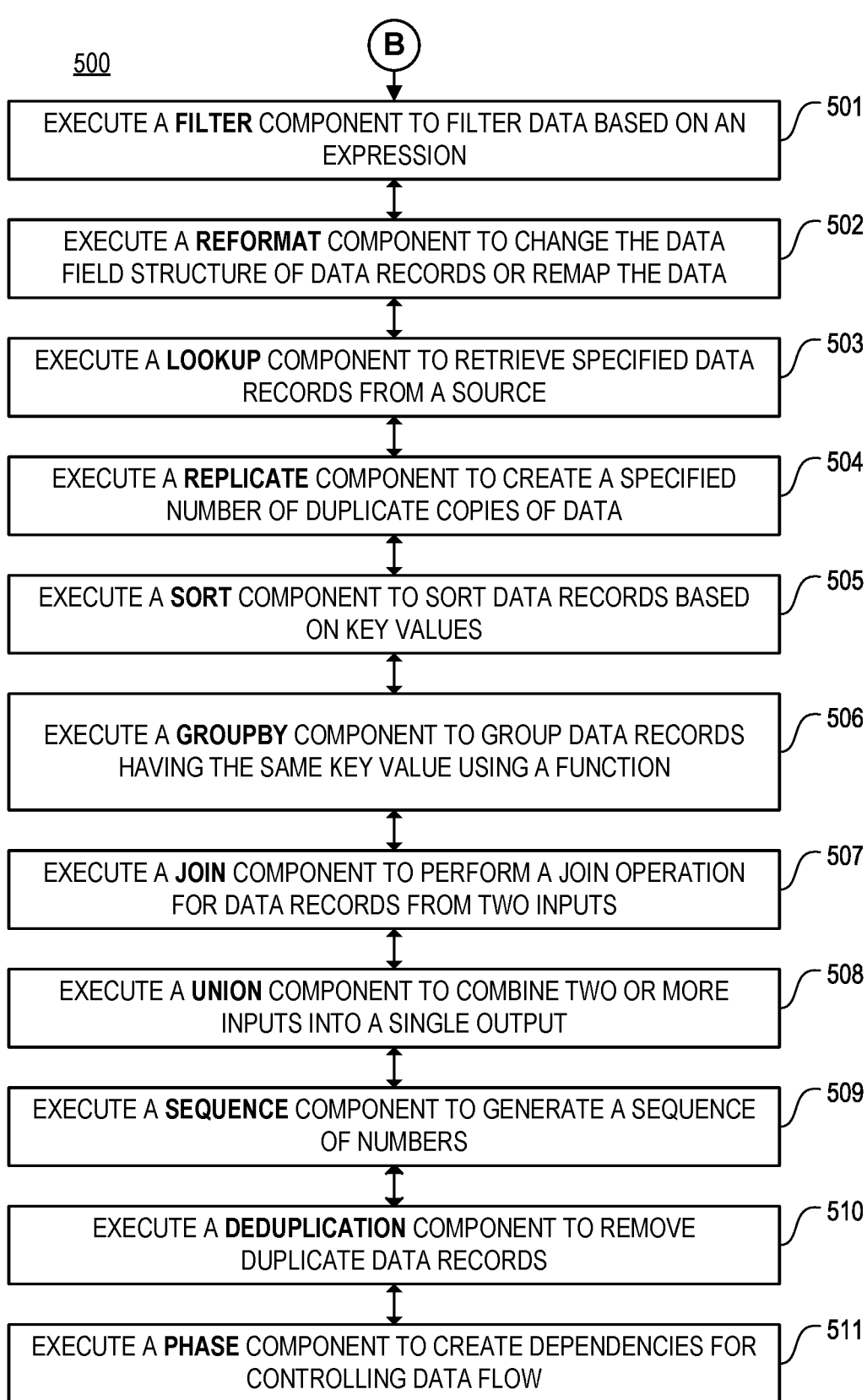

500

Ⓑ

EXECUTE A FILTER COMPONENT TO FILTER DATA BASED ON AN EXPRESSION ⟋ 501

EXECUTE A REFORMAT COMPONENT TO CHANGE THE DATA FIELD STRUCTURE OF DATA RECORDS OR REMAP THE DATA ⟋ 502

EXECUTE A LOOKUP COMPONENT TO RETRIEVE SPECIFIED DATA RECORDS FROM A SOURCE ⟋ 503

EXECUTE A REPLICATE COMPONENT TO CREATE A SPECIFIED NUMBER OF DUPLICATE COPIES OF DATA ⟋ 504

EXECUTE A SORT COMPONENT TO SORT DATA RECORDS BASED ON KEY VALUES ⟋ 505

EXECUTE A GROUPBY COMPONENT TO GROUP DATA RECORDS HAVING THE SAME KEY VALUE USING A FUNCTION ⟋ 506

EXECUTE A JOIN COMPONENT TO PERFORM A JOIN OPERATION FOR DATA RECORDS FROM TWO INPUTS ⟋ 507

EXECUTE A UNION COMPONENT TO COMBINE TWO OR MORE INPUTS INTO A SINGLE OUTPUT ⟋ 508

EXECUTE A SEQUENCE COMPONENT TO GENERATE A SEQUENCE OF NUMBERS ⟋ 509

EXECUTE A DEDUPLICATION COMPONENT TO REMOVE DUPLICATE DATA RECORDS ⟋ 510

EXECUTE A PHASE COMPONENT TO CREATE DEPENDENCIES FOR CONTROLLING DATA FLOW ⟋ 511

FIG. 5

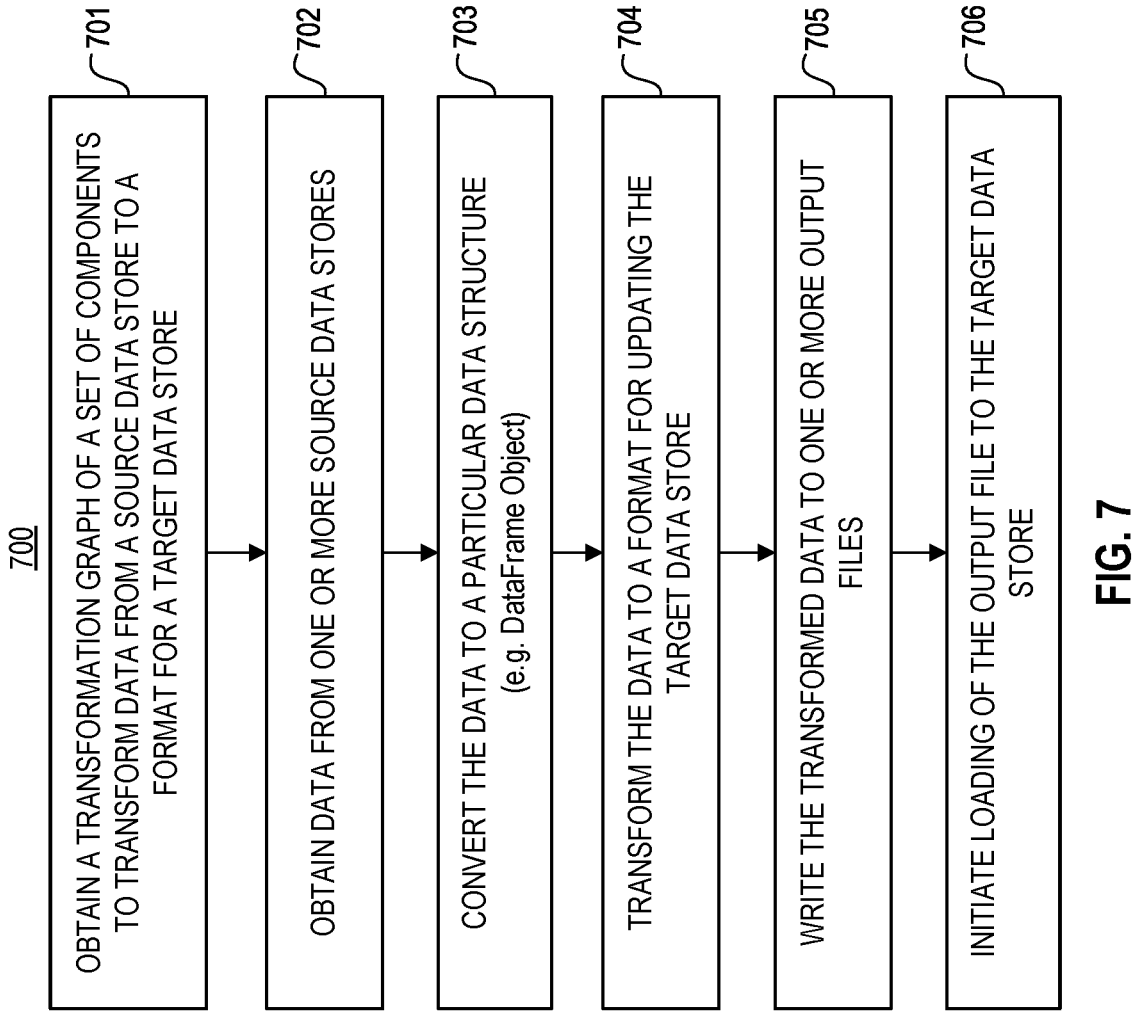

700

701 — OBTAIN A TRANSFORMATION GRAPH OF A SET OF COMPONENTS TO TRANSFORM DATA FROM A SOURCE DATA STORE TO A FORMAT FOR A TARGET DATA STORE

702 — OBTAIN DATA FROM ONE OR MORE SOURCE DATA STORES

703 — CONVERT THE DATA TO A PARTICULAR DATA STRUCTURE (e.g. DataFrame Object)

704 — TRANSFORM THE DATA TO A FORMAT FOR UPDATING THE TARGET DATA STORE

705 — WRITE THE TRANSFORMED DATA TO ONE OR MORE OUTPUT FILES

706 — INITIATE LOADING OF THE OUTPUT FILE TO THE TARGET DATA STORE

FIG. 7

SYSTEM FOR PERFORMING DATA TRANSFORMATIONS USING A SET OF INDEPENDENT SOFTWARE COMPONENTS

RELATED APPLICATIONS

This application is a continuation of U.S. patent application Ser. No. 16/109,106 filed on Aug. 22, 2018. The contents of the above application is incorporated by reference as if fully set forth herein in its entirety.

COPYRIGHT NOTICE

TECHNICAL FIELD

This disclosure relates to a system that performs data transformations, and more particularly, a system that performs data transformations using a set of independent software components.

BACKGROUND

When managing database systems, it is often necessary to transfer data between heterogeneous systems. To facilitate such a process, various tools have been developed to extract, transform, and load (ETL) data from a source database to a target database. These tools, however, are often specialized and configured for particular proprietary database systems. Accordingly, developers often require specific knowledge of the proprietary systems, which limits the ability to update and scale such systems. Moreover, such ETL tools often require particular hardware requirements with minimal configurability. Accordingly, currently available ETL tools are not well-suited for current development architectures that require customization and scalability. Accordingly, there is a need for a framework that provides ETL tools that are flexible and deployable across various types of infrastructures.

BRIEF DESCRIPTION OF THE DRAWINGS

The accompanying drawings, which are incorporated into and constitute a part of this specification, illustrate implementations of the disclosure and together with the description, serve to explain the principles of the disclosure.

FIG. 3 is a process flow diagram illustrating an example of a process for performing data transformations according to one or more implementations of the disclosure.

FIG. 4 is a process flow diagram illustrating an example of a process for executing a set of components according to one or more implementations of the disclosure.

FIG. 5 is a diagram illustrating an example of various transformation operations that may be performed by a set of transformation components according to one or more implementations of the disclosure.

FIG. 7 is a flow diagram illustrating an example of a method for performing data transformations according to one or more implementations of the disclosure.

DETAILED DESCRIPTION

Figure 1:
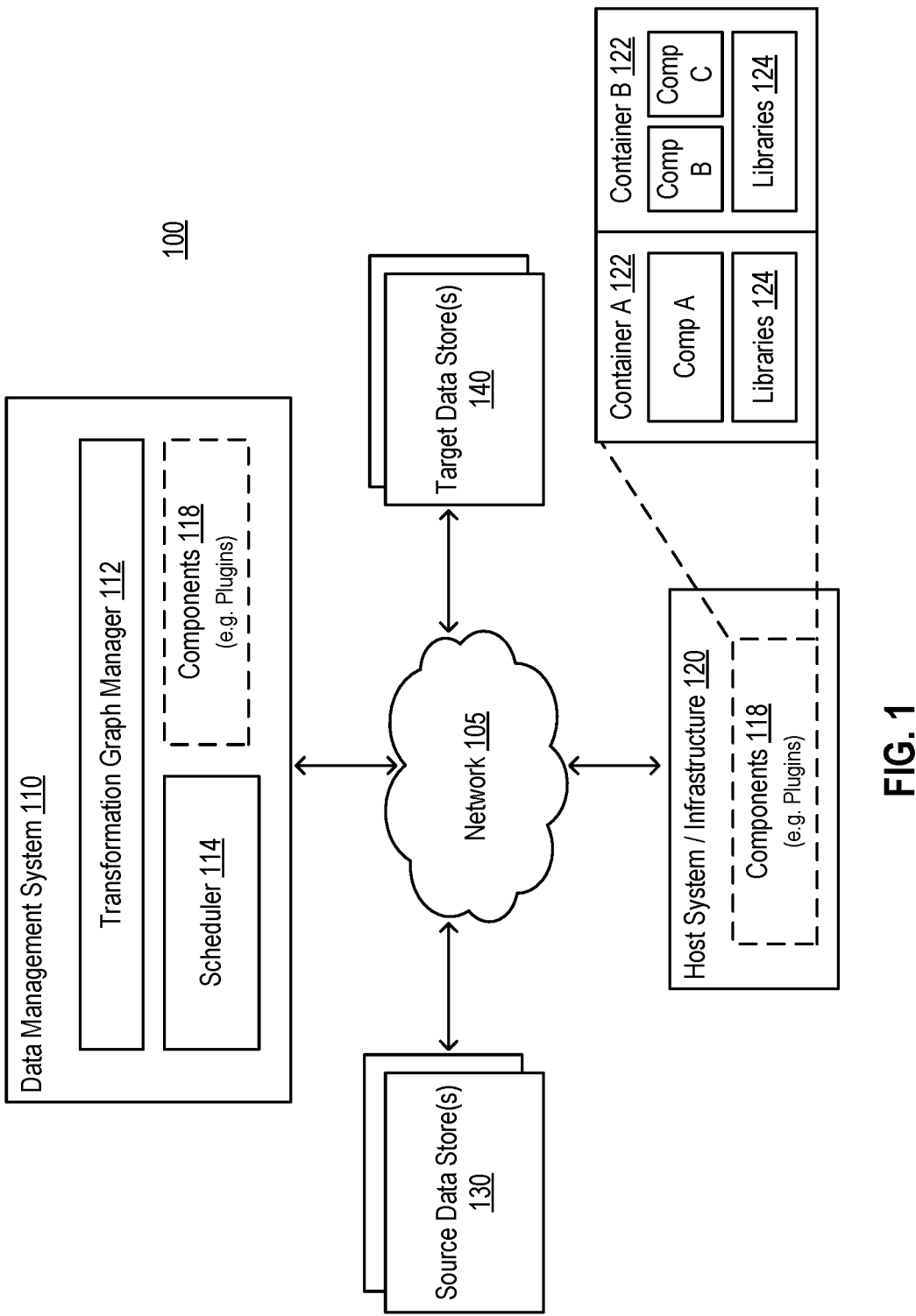
FIG. 1 is a block diagram illustrating an example operating environment for performing data transformations using a set of components according to one or more implementations of the disclosure.

Various implementations and aspects of the disclosures will be described with reference to details discussed below, and the accompanying drawings will illustrate the various implementations. The following description and drawings are illustrative of the disclosure and are not to be construed as limiting the disclosure. Numerous specific details are described to provide a thorough understanding of various implementations of the present disclosure. However, in certain instances, well-known or conventional details are not described in order to provide a concise discussion of implementations of the present disclosure.

Reference in the specification to "one implementation" or "an implementation" or "some implementations," means that a particular feature, structure, or characteristic described in conjunction with the implementation can be included in at least one implementation of the disclosure. The appearances of the phrase "implementation" in various places in the specification do not necessarily all refer to the same implementation.

In some implementations, described is a system (and method) that provides a framework for performing data transformations, which may be part of an Extract, Transform, and Load (ETL) process. The system may perform data transformations by creating and executing one or more sequences of operations using a preconfigured set of independent software components (or plugins). In one implementation, such components may be executed as individual services (e.g., microservices) that may be provided within containers to be deployed as self-contained units on various types of infrastructure. For example, the set of components may be deployed within a cloud-based computing platform or service. In addition, to provide further flexibility of the framework, the components may be implemented using preexisting software libraries. For example, the set of components may be implemented using the Python programming language and related libraries such as the Python Data Analysis Library (e.g., "pandas" library).

When performing transformations, the system may initiate the execution of a set of components as represented in a transformation graph. The transformation graph may represent a data transformation workflow or a sequence of operations performed by the set of components. In one implementation, the data transformations may be executed as a pipeline (or data pipeline), which may support graph, tree, pipe, or other structures. As further described herein, the set of components may include a source component, a set of transformation components, and a target component. Accordingly, the compartmentalized nature of the framework allows for components to be added, modified, or removed as necessary without affecting the functioning of the remaining components. Moreover, by allowing the components to be provided on a host infrastructure (e.g., cloud-based computing system), the system may be scaled as necessary.

The system may obtain or create a transformation graph for a set of components that represents a workflow or a sequence of operations. In one implementation, a developer (or user) may identify a set of source data stores from which data is to be obtained (e.g., extracted) and identify one or more target data stores to which the data is to be provided (e.g., loaded). Based on an analysis the type of source data and the target, the system may create a transformation graph that performs the necessary intermediary data transformations using the necessary components. Alternatively, or in addition to such a determination, the system may allow a developer to create a transformation graph (e.g., using a graphical development environment) specifying the set of components required to perform various sequence of operations for the data transformation.

Accordingly, in some implementations, described is a flexible and scalable framework for performing data transformations in an infrastructure agnostic manner.

FIG. 1 is a block diagram illustrating an example operating environment for performing data transformations using a set of components according to one or more implementations of the disclosure. As shown, the operating environment 100 may include a data management system 110, host system/infrastructure (or host system) 120, source data store(s) 130, and target data store(s) 140, which may interact via a network 105. The network 105 may be any type of wired or wireless network including a local area network (LAN), a wide area network (WAN), a direct communication link, or other suitable connection.

The data management system 110, source data store 130, and target data store 140 may be associated with particular entities. For example, a particular entity (e.g., financial entity) may be associated with the data management system 110 and a target data store 140. For example, the entity, via the data management system 110, may collect and maintain data related to services or products (e.g., financial accounts, credit card information, etc.) provided by various vendors (or partners) associated with the entity. Accordingly, as part of a data management (or warehousing) process for the entity, the data management system 110 may obtain data from source data stores 130 associated with such vendors. These vendors, however, may maintain and store data in different types of database systems and in differing formats. Accordingly, the database management system 110 may transform data obtained from the source data store 130 to a format suitable for updating (or loading) onto the target data store 140. A format suitable for uploading may include transforming the data such that the data structure (e.g., table representation) is compatible with the target data store 140. In addition, a format suitable for uploading may include performing various other efficiency operations (deduplication, filtering, sorting, etc.) to reduce or restructure the data to minimize the required footprint to store the data on the target data store 140. The data stores (e.g., source data store 130 and the target data store 140) may be any type of system, database, file, data structures, etc. that is suitable for storing data. The data stores may provide (e.g., export) data in any suitable format. In one implementation, the data may relate to tabular data. The data stores may provide the data as a file (e.g., flat file) that structures data in various formats (e.g., comma-separated values (CSV), or another delimited format). In addition, the data may be provided in various other file types/structures such as XML (Extensible Markup Language), JSON (JavaScript Object Notation), Excel file, etc.

As shown, the data management system 110 may include a transformation graph manager 112, a scheduler 114, and a set of components 118. As further described herein, the transformation graph manager 112 may obtain or create a transformation graph that represents one or more sequences of operations performed by the set of components 118. For example, the transformation graph manager 112 may obtain saved transformation graphs that may be retrieved for particular types of transformations. In addition, the transformation graph manager 112 may also create a transformation graph from input/instructions provided by a user.

The scheduler 114 may schedule the execution of various processes related to performing data transformations as described herein. The scheduler 114 may schedule obtaining data from source data stores 130. For example, the scheduler 114 may schedule the retrieval of data files from the source data stores 130. In addition, the scheduler 114 may schedule the updating (or loading) of the target data stores 140. For example, the scheduler 114 may schedule the loading of an output created as part of a transformation process. In one implementation, the scheduler 114 may follow a particular schedule for initiating or obtaining data from the source data store 130 and performing data transformations for updating the target data store 140. For example, the scheduler may initiate a data transformation as part of a maintenance schedule (e.g., hourly, daily, weekly, etc.). In one implementation, obtaining data from the source data stores 130 may include obtaining data that is associated with various time points (or periods) such as a current day, previous day, etc.

The host system 120 may be part of a separate system (or infrastructure) as shown, or part of the data management system 110, or a combination of both. In one implementation, the host system 120 may reside on an infrastructure provided by a third-party computing platform (e.g., cloud computing service or cloud database service). In such configurations, the data management system 110 may initiate various operations to be performed on the host system 120. In one implementation, the set of components 118 may be stored (fully or partially) on the host system 120, and execution of such components may be initiated from the data management system 110. For example, the instructions to initiate the execution of the set of components on the host system 120 may be provided remotely via a communications protocol from the data management system 110. Accordingly, in some implementations, the system provides an advantage over previous systems in that the framework may perform transformations using a scalable cloud-based computing infrastructure.

As described, processes performed by the data management system 110 may be performed with a set of components 118. Each component may be an independent unit (or package) of software that may perform a particular operation. The component may also be referred to as a plugin (or plug-in), service or microservice, package, extension, etc. In one implementation, each component may be individually executable and may execute on its own processing thread as part of a pipeline. In one implementation, the components 118 may be implemented using existing software libraries. For example, each component may be implemented using a pandas (or pandas) library (e.g., libraries 124) that is available for the Python programming language. In one implementation, the set of components 118 may be implemented using a service-oriented architecture (SOA) or a microservices architecture. For example, each component may be executed as a microservice. Generally, a microservices architecture relates to a development technique that provides modularity by providing a set of related but independent services. For example, an advantage of a microservices architecture is that components to may be deployed, added, removed, modified, and redeployed independently without compromising the integrity of the remaining components or an application. Accordingly, in some implementations, the system provides an advantage over previous systems in that transformations may be executed by individual components. Such a configuration provides the ability to customize or modify particular components which was not previously available, for example, with proprietary ETL frameworks.

The components 118 may also be provided (or encapsulated) within a container 122. As shown, one or more components 118 may be provided within a container 122, or each component may be provided within a container 122. Containers (or container images) may provide a form of operating system virtualization that allows the execution of components 118 in a resource-isolated manner. In one implementation, the containers 122 may be provided by a platform that performs operating-system-level containerization. For example, the platform may allow for the utilization of lightweight containers to run processes (e.g., components 118) in isolation. For example, each container 122 may run in separate kernel namespaces or cgroups (e.g., control groups). The containers 122 may be implemented using any suitable platform including, for example, the Docker platform (e.g., provided by Docker, Inc.). However, any other suitable platform or technique to implement containers may also be utilized. It addition, other forms of virtualization are also contemplated such as implementing components 118 within a virtual machine environment.

As shown, each container 122 may include libraries (or library) 124 as well as any other software components/tools such as binaries required to execute one or more components. As further described herein, the transformation processes may manipulate and transform data. Accordingly, the libraries 124 may include various operations, data structures, and other tools for data manipulation and analysis. In one implementation, the data structures and operations may relate to manipulating numerical tables and time series. For example, the operations and data structures may be associated with "panel data." Generally, panel data (or longitudinal data) are multi-dimensional data involving measurements over time. In one implementation, the libraries 124 may provide tools for manipulating relational or label data. For example, the data may be tabular data (e.g., an SQL table, or an excel spreadsheet), ordered and on order timeseries data, 2-dimensioal labeled data structures, matrix data with row and column, arrays, series, and any other forms of data including data structures for various observational and/or statistical data sets. As described, in one implementation, the libraries 124 may include a Python Data Analysis Library (e.g., pandas library). For example, the pandas library may provide a DataFrame object for data manipulation. In one implementation, a DataFrame (or dataframe) includes a 2-dimensional labeled data structure with columns of potentially different types (e.g., similar to a spreadsheet or SQL table). For example, the DataFrame may accept inputs including arrays, lists, series, other DataFrames, etc. Accordingly, in some implementations, the components may leverage existing tools to perform data transformations.

Figure 2:
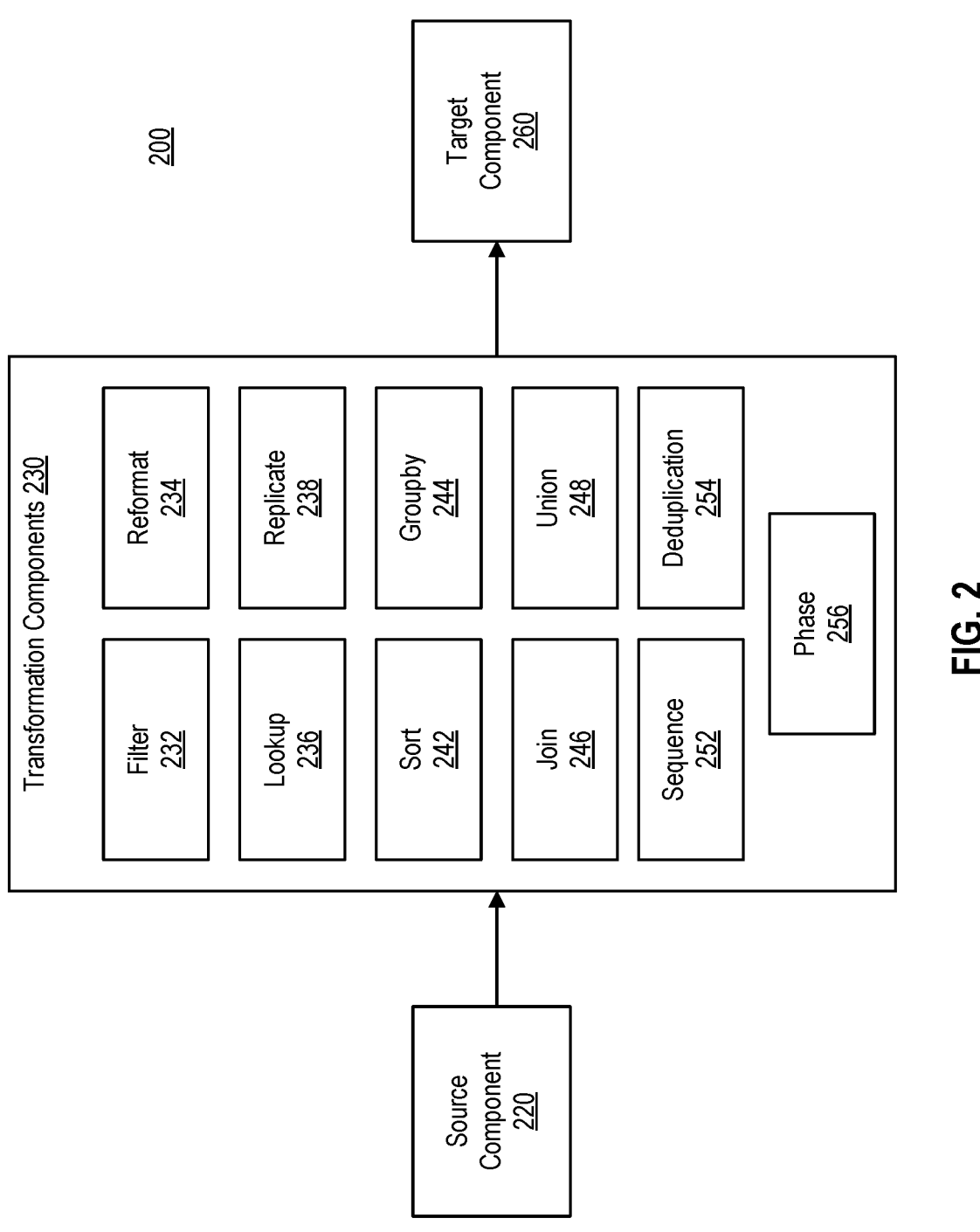
FIG. 2 is a block diagram illustrating an example set of components for performing data transformations according to one or more implementations of the disclosure.

FIG. 2 is a block diagram 200 illustrating an example set of components for performing data transformations according to one or more implementations of the disclosure.

As shown in diagram 200, the set of components (e.g., components 118) may include source components 220, transformation components 230 and target components 260. Each component (or plugin, service or microservice, package, extension, etc.) may perform a particular operation, for example, as indicated by the name of the component. In one implementation, the component may include a plugin implemented using the Python programming language. As described, in one implementation, each component may be a package (or unit) of software that may be independent and executable as a microservice within a container of a host system.

In one implementation, the components may include a source component which obtains data from one or more heterogeneous source data stores (e.g., source data store 130). The data may be converted to a particular data structure. For example, the data may be converted into a 2-dimensioal labeled data structure, a table structure, a data frame or DataFrame object (e.g., as provided by the pandas library), and various other data structure formats. For example, a source component 220 may read data from a source data store (e.g., input file or query a database) and output data in a particular format (e.g., DataFrame). The system may then perform a set of transformation operations with a set of corresponding transformation components 230.

The transformation components 230 may each perform a corresponding (or associated) operation. As shown in this example, the transformation components 230 may include a filter (or filter by expression) component 232, a reformat component 234, a joint component 236, a sort component 238, deduplication (or dedup) component 242, groupby (or aggregate, or rollup) component 244, a union (or concatenate) component 246, a lookup component 248, a sequence (or scan) component 252, a phase component 254, and a replicate component 254.

After performing operations using the data transformation components 230, a target component 260 may provide an output (e.g., output file or load a database) suitable for updating or loading a target data store 140. It should be noted that the set of components shown in diagram 200 are merely examples, and additional components that perform additional operations are also contemplated. In addition, the component names (and corresponding operations) are considered to be examples and that components with different names that perform substantially similar operations are also contemplated.

FIGS. 3-5 are process flow diagrams illustrating example processes for performing a data transformation according to one or more implementations of the disclosure. Processes 300, 400, and 500 may use processing logic, which may include software, hardware, or a combination thereof. For example, these processes may be performed by a system including one or more components described in operating environment 100 (e.g., data management system 110, host system 120, etc.).

FIG. 3 is a process flow diagram illustrating an example of a process for performing a data transformation according to one or more implementations of the disclosure.

In 301, the system (e.g., data management system 110) may obtain a transformation graph of a set of components (e.g., components 118) to transform data from a source data store (e.g., source data store 130). The transformation graph may represent a workflow or one or more sequences of operations performed by the set of components to transform data from a source data store to a format for updating a target data store (e.g., target data store 140). In one implementation, the transformation graph may be obtained by retrieving a previously saved transformation graph.

In addition, in one implementation, the system may create a transformation graph. For example, a developer (or user) may identify a set of source data stores from which data is to be obtained (e.g., extracted) and identify one or more target data stores to which the data is to be provided (e.g., loaded). Based on an analysis the type of source data and the target, the system may create a transformation graph that performs the necessary intermediary data transformations using the necessary components. Alternatively, or in addition to such a determination, the system may allow a developer to create a transformation graph by specifying the set of components required to perform various sequence of operations for the data transformation. For example, a user may select various components from the set of components within a graphical development environment (GDE). In one implementation, the system may implement various rules to allow a developer to configure a transformation graph to perform various operations. For example, the system may provide an interface that maintains certain rules (e.g., rules for various input/output paths for a data pipeline) allowing a user to drag and drop components within an interface to create the transformation graph.

In 302, the system may obtain data from the source data store. For example, the system may obtain (or retrieve, receive, etc.) data from a data file provided by a source data store. For example, a vendor may provide a data file from a vendor database. In addition, in some implementations, the system (or source component) may directly retrieve such data from a system associated with a vendor (e.g., via a direct vendor database query).

In 303, the system may initiate an execution of the set of components to perform one or more sequences of operations to transform the data. In one implementation, the sequence of operations (or workflow or processing sequence) may be determined based on the transformation graph. In one implementation, the execution of the set of components may be performed as an execution pipeline (or data pipeline). For example, a pipeline may include a sequence of operations (or commands, program runs, tasks, threads, procedures, etc.) conceptually executed in parallel in which the output (or output stream) from the execution of one component may be automatically provided as the input (or input stream) to the next component of the sequence. The one or more sequences of operations may include executing one or more components as further described in FIG. 4.

In 304, the system may provide the transformed data to the target data store. For example, the system may initiate the uploading (e.g., load) of one or more files (or output files) created from executing the transformation process to the target data store. In one implementation, a target component may initiate such an uploading. For example, the target component may update a target database.

FIG. 4 is a process flow diagram illustrating an example of a process for executing a set of components according to one or more implementations of the disclosure. As described, one or more components may be executed as part of an execution pipeline initiated by the system. For example, data that is output from a particular component may be provided as input into a component that is next in the sequence. For instance, the components may perform operations on the columns of the data as part of a transformation process.

In 401, the system may execute a source component (e.g., source component 220) to read the obtained data and convert the obtained data to a data structure used for the transformation process. In one implementation, the data structure may include a 2-dimensioal labeled data structure, a table data structure, a DataFrame, or any other format that may be used, for example, for manipulating panel data. The source component may perform a read operation of various types of files. As described, the components may be implemented using the Python programming language and related libraries. Accordingly, such components may be configured as further described below.

For example, a configuration for a source component may include:

```
"config": {
        "file_path_name": "input file",
        "schema":"schema file ",
        "file_type":"DL, json, FW",
        "delimiter":"[,|,\t]",
        "contain_column_names":"Y",
}
```

For example, as shown, the source component may read an input file including a JSON file type with a specified delimiter value.

In 402, the system may execute one or more transformation components (e.g., transformation components 230) to transform the data to a format for updating the target data store. The transformation components may perform various operations as further described in FIG. 5.

In 403, the system may execute a target component to write the transformed data to an output file. For example, the target component may initiate uploading the output file to a target data store as part of a backup process.

For example, a configuration for a target component may include:

```
"config": {
        "file_path_name": "output file path",
        "target_filetype":"dl, json",
        "delimiter":"[,|,\t]"
}
```

For example, as shown, the target component may create an output file including a JSON file type with a specified delimiter value.

FIG. 5 is a process flow diagram illustrating an example of various transformation operations that may be performed by a set of transformation components according to one or more implementations of the disclosure. The system (e.g., data management system 110 or host system 120) may execute (or initiate the execution of) the components as described. It should be noted that the numbering of operations 501-511 is provided to merely identify and distinguish between operations and that execution of the components shown in operations 501-511 may be performed in any order as part of the transformation process.

In 501, the system (e.g., data management system 110 or host system 120) may execute (or initiate the execution of) a filter component to filter data based on an expression. For example, if the filter expression evaluates to true, the data will be passed-through, and if the filter expression evaluates to false, the data will be removed from further processing or will be redirected.

For example, a configuration for a filter component may include:

```
"filterCondition": {
        "selectCond": "filter expression",
        "deSelectCond": "Y/N"
}
```

In 502, the system may execute a reformat component to change the structure of data records or remap certain data records. For example, the reformat operation may perform field-level data transformations or mappings for a given input.

For example, a configuration for a reformat component may include:

```
"transformation": {
        "route0": {
            "1": "output_field = (input_field == 'condition',
        'True', strip(input_field))",
            "2": "output_field_2 = input_field"
        },
        "route1": {
            "1": "custom_column2 = star_rating"
        }
},
"pass_through": {
        "route0": "N",
        "route1": "Y"
},
"exclude_columns":{
        "route0" : ["input_field1"],
        "route1" : ["input_field2"]
},
"router":{
        "route0" : "input_field == 'R'",
        "route1" : "input_field != 'R'"
},
"is_empty_fail": "Y"
```

In 503, the system may execute a lookup component to retrieve specified data (e.g., data records) from a source data store. For example, the lookup operation may include inputting a primary input file and/or a lookup input file as the input (or input stream) and output specified columns from the lookup input file.

For example, a configuration for a lookup component may include:

```
"config": {
        "lookup_column":"col_1, col_2, ..., col_n",
        "lookup_keys_column":"col_1, col_2, ..., col_n",
        "source_column":"col_1, col_2, ..., col_n"
}
```

In 504, the system may execute a replicate component to create a specified number of duplicate copies of specified data. For example, the replicate operation may output multiple copies (e.g., duplicates, replications, etc.) of the input.

For example, a configuration for a replicate component may include:

```
"config": {
        "start": "starting number",
        "step": "increment value",
        "column_name": "column_name"
}
```

In 505, the system may execute a sort component to sort data records based on specified criteria. For example, the sort operation may order data based on a key value.

For example, a configuration for a sort component may include:

```
"config": {
        "sort_key": {
            "1":"column_name,ascending=False"   ,
            "2":"column_name,ascending=True",
            "3":"column_name"
        },
        "na_position":"first/Last"
}
```

In 506, the system may execute a groupby (or aggregate) component to group data records. For example, data records having the same key value may be grouped. The component may output a summary of a particular function of the grouping. For example, the functions may include providing a value for a minimum, maximum, mean, sum, count, first, and last.

For example, a configuration for a groupby component may include:

```
"Sorted_input": Y/N
"Input_select" : filter expression
"Key": key1,key2,...
"Aggregation":{
        "1":"output_column1 =  input_column.func( )"
        .
        .
}
"Keep": all/ list of column_names
"Output_select": filter expression
```

In 507, the system may execute a join component to perform a join operation for data records from two inputs. For example, the join operation may perform an SQL-style join operation. The join may include an inner, outer, left, right, or cross join. For example, the join component may have three outputs which may include: insertions, which contain records that exist in input 1 and not in input 2; deletions, which contains records that exist in input 2 and not in input 1; and matches, which contain records that are the same in both inputs.

For example, a configuration for a join component may include:

```
"join_type": ("inner", "outer", "right", "left", or "cross")
        "on": {
            "left_on": ("col_1, col_2, ..., col_n"),
            "right_on": ("col_1 col_2, ..., col_n")
        },
"output_unmatched_records": ("y" or "n"),
"transformation": {
        "1":output_column= input_column
},
"pass_through": "("in0" or "in1")",
"exclude_columns": "(column_name)"
"is_empty_fail": ("y" or "n")
```

In 508, the system may execute a union component to combine two or more inputs into a single output.

For example, a configuration for a union component may include:

```
"config": {
},
"class": "Union",
"inputs": [
        "in-1","in-2",...
    ],
"name": "union-1",
"node_id": "x",
"outputs": [
"on-1"
]
```

In 509, the system may execute a sequence component to generate a sequence of numbers. For example, a sequence operation may generate a sequence of consecutive numbers.

For example, a configuration for a sequence component may include:

```
"config": {
    "start": "starting number",
    "step":"increment value",
    "column_name":"column_name"
}
```

In 510, the system may execute a deduplication component to remove duplicate data records. For example, the deduplication operation may identify duplicate records and may remove the first, last, or all duplicate records. The deduplication operation may also collect removed duplicate records through a deselect output.

For example, a configuration for a deduplication component may include:

```
"config": {
    "key":" col_1, col_2, ..., col_n ",
    "keep_order": "first/last/False",
    "deselect_port": "Y"/"N"
}
```

In 511, the system may execute a phase component to create dependencies for controlling the data flow of operations. For example, the phase operation may create dependencies between multiple components and may provide an option to select one or more inputs for further processing.

For example, a configuration for a phase component may include:

```
"config": {
    "select_input": ["in-1","in-2"]
},
"classs": "phase",
"inputs": [
    "in-1","in-2",...,in-n
],
"name": "phase-1",
"node_id": "3 ",
"outputs": [
    "on-1", "on-2"
]
```

It should be noted that the above configuration examples are provided using the Python programming language and related libraries (e.g., pandas). However, implementations using other programming languages to provide substantially equivalent functionality is also contemplated. As described, an execution of a sequence of the components may be based on a transformation graph.

Figure 6:
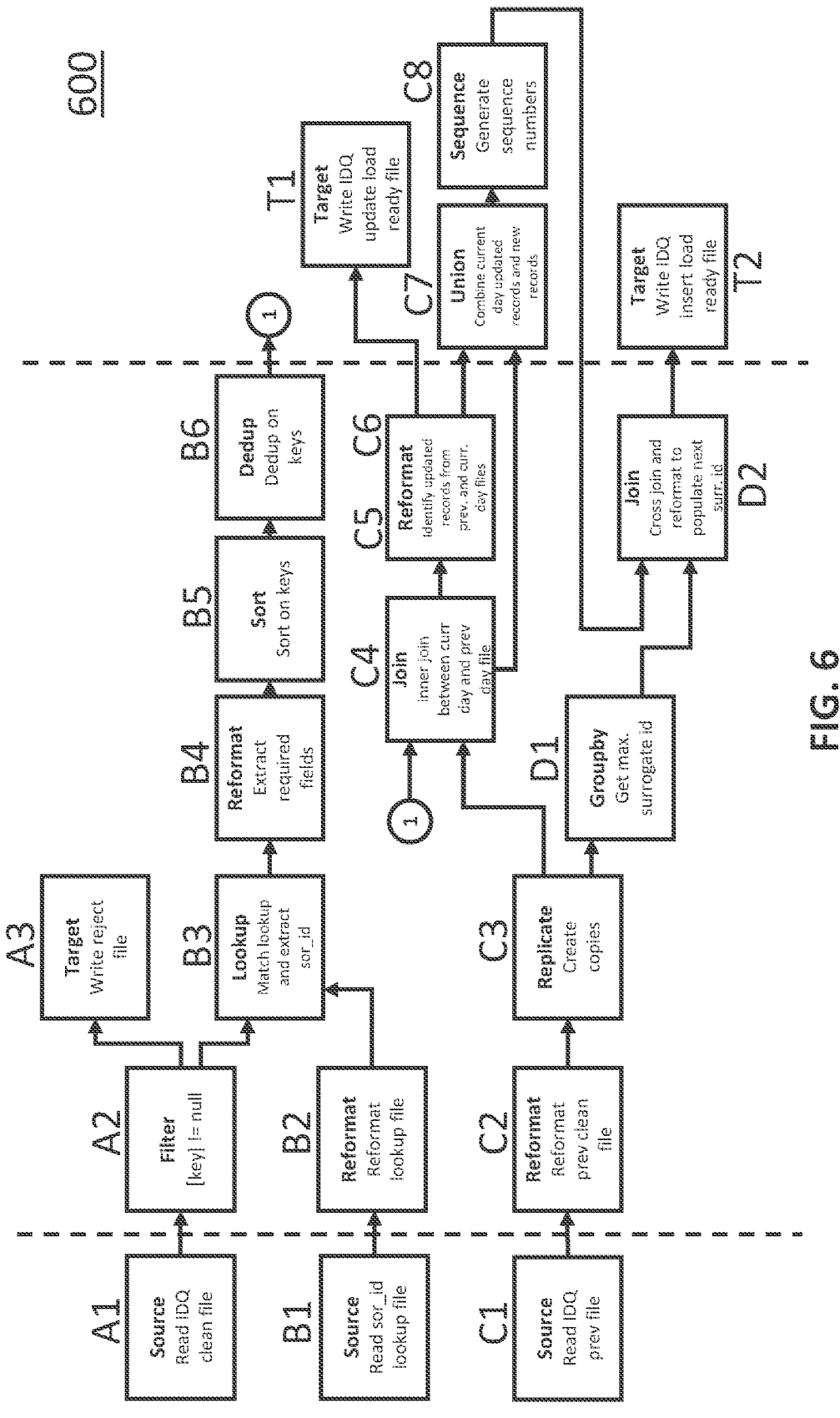
FIG. 6 is a diagram illustrating an example transformation graph of a set of components representing one or more sequences of operations to perform data transformations according to one or more implementations of the disclosure.

FIG. 6 is a diagram illustrating an example transformation graph 600 of a set of components (e.g., components 118) representing one or more sequences of operations to perform a data transformation according to one or more implementations of the disclosure.

As shown, the transformation graph 600 may represent a set of components (e.g., as nodes of the graph) that represent a sequence of operations (e.g., as represented by the directional vertices). For example, as described, the components may perform operations on the columns of the data as part of a transformation process.

As shown in this example, the source data may correspond to data that is related to data at various time points, which in this example includes data associated with a current day, and data associated with a previous day. In this example, three source components (A1, B1, and C1) read data from three sources. Sequence A may commence by executing a source component A1 that reads data from a file (e.g., current day file) and converts the data into a particular data structure (e.g., DataFrame object). The converted data may be provided to a filter component A2 that filters the data. The data that is filtered out may be written to a reject file by target component A3. The remaining data may be used by a lookup component B3. In addition, the lookup component B3 may obtain data from a reformat component B2. As shown, sequence B may commence by executing source component B1 that reads data from a file. As described above, source component B1 may convert the data into a particular data structure (e.g., DataFrame object), which is then reformatted by reformat component B2. Accordingly, lookup component B3 may use reformatted data from B2 and the filtered data from A2 to lookup data in one or more columns of an input file. This data may then be provided to the reformat component B4 to extract a set of required fields. The extracted data may then be provided to a sort component B5 that performs a sort based on the keys of the data records. Next, the deduplication component B6 may remove the duplicate records. For example, the duplicate records may be determined based on the keys for each record. Next, the join component C4 may perform a join operation. As shown, source component C1 may read a file (e.g., a previous day file) and convert the data as described above. The converted previous day data may then be provided to reformat component C2. The reformatted data may then be provided to replicate component C3 which create two copies of the data. For example, as shown in this example, one copy is provided to groupby component D1, and the other copy to join component C4. For example, an inner join between the current day data that was deduplicated by component B6 and the previous day data replicated by component C3 may be performed. Accordingly, the joined current day data and previous day data may be provided to reformat component C5. Next, this reformatted data may be provided to the target component T1 that writes an update load ready file. In addition, this reformatted data may be provided to a union component C6 that combines the current day updated records with new records provided by the join component C4. Accordingly, sequence component C7 may generate sequence numbers and provide such information to another join component D2 which joins the previous day data with the data combined in C6. This joined data may then be provided to target component T2 that writes the data to an insert load ready file.

As shown in this example, two outputs may be created (T1 and T2). For example, the system may include a master list of all accounts and details. Accordingly, the system may receive a data file daily with account updates or changes to a subset of the accounts. The system may process these accounts (e.g., perform a transformation process as described herein) and create a data file to account for only these changes (e.g., T2). However, the master list may not be synchronized with such changes for the current day, an accordingly, the master list may also need to be updated. Accordingly, the system may create an additional file (e.g., T1) to account for such changes that is used to synchronize the master list with the actual data.

Accordingly, the sequences of operations in this example obtain data from multiple data sources, transform the data, and write the data to output files for updating a target data store.

FIG. 7 is a process flow diagram illustrating an example of a method for performing a data transformation using a set of components according to one or more implementations of the disclosure. Process 700 may use processing logic, which may include software, hardware, or a combination thereof. For example, process 700 may be performed by a system including one or more components described in operating environment 100 (e.g., data management system 110, host system 120, etc.).

In 701, the system (e.g., data management system 110) may obtain a transformation graph of a set of components. In one implementation, the system may create a transformation graph of the set of components. For example, the system may identify one or more source data stores that provide data to be extracted by the system, and based on the source data stores, determine a set of transformation components (or operations) that are required to load the data onto a specified target data store. As described, each component may be executable as an independent service and may perform a predefined operation. The transformation graph may represent one or more sequences of operations to transform data from one or more source data stores (e.g., source data store 130) to a format for updating the target data store (e.g., target data store 140).

The system may then initiate an execution of a set of components based on the transformation graph. The execution of the set of components may include executing one or more source components (e.g., source component 220), one or more data transformation components (e.g., transformation components 230), and one or more target components (e.g., target component 260). In one implementation, each component may execute as a separate process on its own processing thread. In addition, the execution of the set of components may be performed as part of a data pipeline. For example, each component may be implemented as an independent microservice within a stand-alone container (e.g., container 122). In one implementation, each component may be implemented using a python data analysis library (e.g., libraries 124). As described, each component may be deployed within a container on a host (e.g., host system 120) that is remote from the system (data management system 110) and executed by an instruction from the system using a communication protocol. For example, the system may initiate execution of a component via a web service or API (Application Programming Interface).

In 702, the system may read data from the one or more source data stores. For example, the source component may read a data file provided by the source data store. In one implementation, the data may be obtained by the system, for example, prior to the execution of the components (e.g., source component). For example, the system may obtain a file from the source data store that is part of a process that is separate from the execution of the source component. For instance, the system may obtain such data files as part of a scheduled data management process. In addition, the source component may obtain the data directly from the source data store. For example, the source component may perform a query of a source database to read data directly from a source data store.

As described, although various vendors associated with the source data stores 130 may maintain similar types of data, such data may be stored using different database systems that structure data in various differing formats. For example, the different formats may include data stored in tables with different column headings. For example, data may be provided by a first entity in a first format (e.g., comma delimited) and by a second entity in a second, different, format (e.g., JSON file). In addition, the data may be read from a data file (e.g., JSON file) and directly from a source data store (e.g., database using a query command). In addition, the source data (e.g., data files) may correspond to different time periods (or points in time). For example, the time periods may include a previous day and a current day, or any other time periods. Accordingly, the system may reconcile and update the data based on the changes between time periods.

In 703, the system may convert the data to a particular data structure. In one implementation, the system may convert the data into a table data structure. For example, the table data structure may include a DataFrame object of the python data analysis library.

In 704, the system may transform the data. For example, the system may perform various transformation operations by executing one or more transformation components as described above.

In 705, the system may write the transformed data to one or more output files for updating the target data store. In one implementation, a target component may perform such a write operation. For example, the target component may create an output file that may later be uploaded to the target data store by the system. In one implementation, the output file may include a JSON file, or any other suitable output file format. In addition, the target component may write the data directly to the target data store or write data to an output file and initiate the loading of the output file to the data store.

In 706, the system may initiate a loading of the one or more output files to the target data source. For example, the target data store may initiate a loading as described above. In addition, or alternatively, the system may initiate loading of the file to the target data store, for example, in a process separate from executing the target component.

In one implementation, obtaining the data from the one or more source data stores may include obtaining data for a first time point and a second time point. For example, the first and second time points may correspond to data associated with a current and previous day. In one implementation, such data may be transformed initially by separate transformation sequences. For example, outputting the table data structure of the data (e.g., DataFrame) may include outputting data for the current day to a first table data structure (e.g., first DataFrame), and outputting data for the previous day to a second table data structure (e.g., second DataFrame). Accordingly, in such implementations, transforming the data of the table data structure may include transforming the first table data structure as part of a first sequence of transformation operations, and transforming the second table data structure as part of a second sequence of transformation operations. For example, the one or more transformation components may include a join component that performs a join operation to combine the data of the current day with the previous day. As another example, the one or more transformation components may include a deduplication component that performs a deduplication operation to remove duplicate records of the combined data of the current day and the previous day. In addition, in such implementations, writing the combined data to the one or more output files for updating the target data store may include writing an insert file of new and updated records from the data of the current day and writing an update file of updated records from the data of the previous day. In addition, as described above, any number of additional operations may be performed by executing additional transformation components (e.g., transformation components 230) as described above.

It should be noted that the operations (or processes, methods, etc.) shown and described above are not necessarily performed in the order indicated and may be performed in parallel. It should also be understood that the methods may include more or fewer operations than are indicated. In some implementations, operations described herein as separate operations may be combined. Conversely, operations that may be described herein as a single operation may be implemented in multiple operations.

Figure 8:
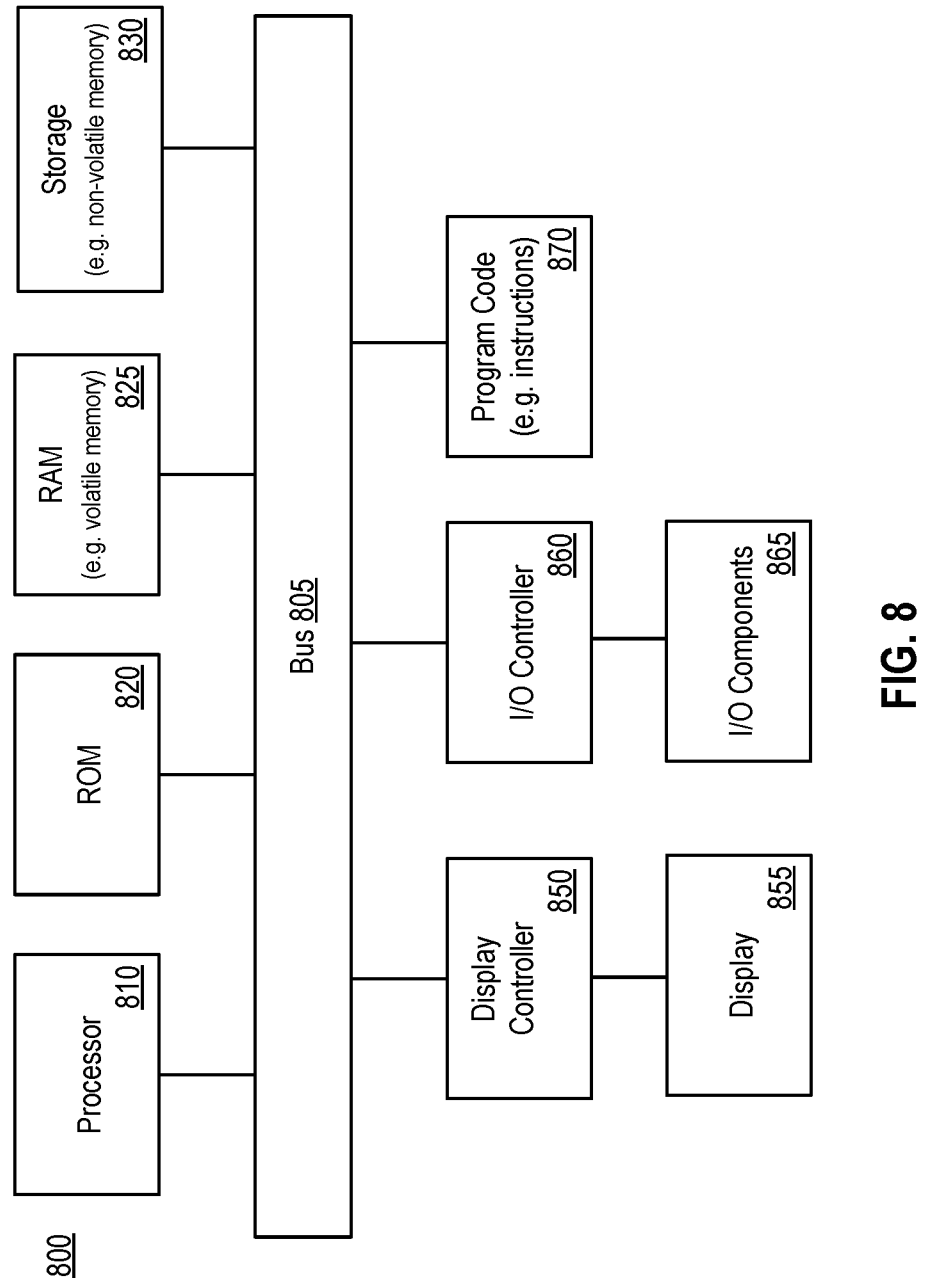
FIG. 8 is a block diagram illustrating an example of a computing system that may be used in conjunction with one or more implementations of the disclosure.

FIG. 8 shows a block diagram of an example of a computing system that may be used in conjunction with one or more implementations. For example, computing system 800 (or system, or server, or computing device, or device) may represent any of the devices or systems (e.g., data management system 110, host system 120, etc.) described herein that perform any of the processes, operations, or methods of the disclosure. Note that while the computing system 800 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 800 may include a bus 805 which may be coupled to a processor 810, ROM (Read Only Memory) 820, RAM (or volatile memory) 825, and storage (or non-volatile memory) 830. The processor 810 may retrieve stored instructions from one or more of the memories 820, 825, and 830 and execute the instructions to perform processes, operations, or methods described herein. These memories represent examples of a non-transitory computer-readable medium (or machine-readable medium, or storage) containing instructions which when executed by a processor (or system, or computing system), cause the processor to perform operations, processes, or methods described herein. The RAM 825 may be implemented as, for example, dynamic RAM (DRAM), or other types of memory that require power continually in order to refresh or maintain the data in the memory. Storage 830 may include, for example, magnetic, semiconductor, tape, optical, removable, non-removable, and other types of storage that maintain data even after power is removed from the system. It should be appreciated that storage 830 may be remote from the system (e.g., accessible via a network).

A display controller 850 may be coupled to the bus 805 in order to receive display data to be displayed on a display device 855, which can display any one of the user interface features or embodiments described herein and may be a local or a remote display device. The computing system 800 may also include one or more input/output (I/O) components 565 including mice, keyboards, touch screen, network interfaces, printers, speakers, and other devices. Typically, the input/output components 865 are coupled to the system through an input/output controller 860.

Program code 870 (or modules, instructions, components, subsystems, units, functions, or logic) may represent any of the instructions, managers, operations, subsystems, or engines described above. Program code 870 may reside, completely or at least partially, within the memories described above (e.g., non-transitory computer-readable media), or within a processor during execution thereof by the computing system. In addition, program code 870 can be implemented as software, firmware, or functional circuitry within the computing system, or as combinations thereof.

Moreover, any of the disclosed implementations may be embodied in various types of hardware, software, firmware, and combinations thereof. For example, some techniques disclosed herein may be implemented, at least in part, by non-transitory computer-readable media that include program instructions, state information, etc., for performing various methods and operations described herein. Examples of program instructions include both machine code, such as produced by a compiler, and files containing higher-level or intermediate code that may be executed by a computing device such as a server or other data processing apparatus (or machine) using an interpreter.

It should be noted that the components, processes, data, operations, and implementation details described above are examples presented for conciseness and clarity of explanation. Other components, processes, implementation details, and variations may be used without departing from the principles of the disclosure.

It should be noted that the term "approximately" or "substantially" may be used herein and may be interpreted as "as nearly as practicable," "within technical limitations," and the like. In addition, the use of the term "or" indicates an inclusive or (e.g., and/or) unless otherwise specified.

Other implementations of the invention will be apparent to those skilled in the art from consideration of the specification and practice of the invention disclosed herein. It is intended that the specification and examples be considered as examples only, with a true scope and spirit of the invention being indicated by the claims.

What is claimed is:

1. A method comprising:

receiving, by at least one processor, a data retrieval request specifying:

at least one source database from which to retrieve account data and at least one target database to which to load the account data;

identifying, by the at least one processor, at least one source data type associated with the account data in the at least one source database;

identifying, by the at least one processor, at least one target data type associated with the at least one target database;

determining, by the at least one processor, a particular transformation graph from a library of transformation graphs associated with the at least one source data type and the at least one target data type, the particular transformation comprising a plurality of modular operation-specific components representing a plurality of modular transformation operations;

wherein the particular transformation is configured to transform the account data of the at least one source data type to the at least one target data type;

wherein the plurality of modular operation-specific components are configured to be deployable across a plurality of different types of database infrastructures;

wherein each modular operation-specific component of the plurality of modular operation-specific components comprises a distinct software package configured to perform at least one transformation operation of the plurality of transformation operations;

generating, by the at least one processor, a transformation workflow associated with the data retrieval request based at least in part on the plurality of modular operation-specific components;

wherein the transformation workflow specifies a sequence of the plurality of modular operation-specific components to perform the plurality of transformation operations so as to transform the account data from at least one source data format to the at least one target data format;

determining, by the at least one processor, execution scheduling for each modular operation-specific component of the plurality of modular operation-specific components based at least in part on the transformation workflow;

requesting, by the at least one processor, a cloud-based host system to instantiate a plurality of containers for the plurality of modular operation-specific components, wherein each respective container is configured to establish a separate execution environment with a separate processing thread for each respective modular operation-specific component;

receiving, by the at least one processor, at least one modification to the plurality of modular operation-specific components in the transformation workflow;

modifying, by the at least one processor, at least on modular operation-specific component of the plurality of modular operation specific components while executing the transformation workflow, wherein executing the transformation workflow comprising, at each transformation operation of the plurality of transformation operations in the executing scheduling, invoking, via the cloud-based host system, each respective container to execute each respective modular operation-specific component of the plurality of modular operation-specific components with the at least one modification to cause at least one processing resource to transform the account data of a data table structure as part of the plurality of transformation operations performed by the plurality of modular operation-specific components, wherein the plurality of transformation operations comprises:

identifying updated data based upon a comparison of a first subset of the account data associated with a current day and with a second subset of the account data associated with a previous day;

combining the updated data with new data corresponding to at least one new account to produce combined data; and joining the combined data with a copy of the account data of a second table data structure to produce joined data.

2. The method of claim 1, wherein an execution of the sequence of the plurality of modular operation-specific components is performed as a data pipeline.

3. The method of claim 2, further comprising:

utilizing, by the at least one processor, at least one transformation component to perform the sequence;

wherein each modular operation-specific component is implemented using a python data analysis library, and the table data structure includes a DataFrame object of the python data analysis library.

4. The method of claim 3, wherein the at least one transformation component is implemented as an independent microservice or service.

5. The method of claim 4, wherein each microservice or service is deployed within a container on a host that is remote from the at least one transformation component, and the execution of the at least one transformation component is initiated by an instruction to the at least one service using a communication protocol.

6. The method of claim 1, wherein transforming the account data includes the sequence of the plurality of modular operation-specific components comprises:

deduplicating, by a deduplication component, the joined data to remove duplicate records of the joined data associated with the current day and the previous day.

7. The method of claim 1, wherein the sequence of the plurality of modular operation-specific components comprises:

filtering the account data of the table data structure using a filter component to produce filtered data and rejected data; and writing the rejected data to a reject file.

8. The method of claim 7, wherein the sequence of the plurality of modular operation-specific components comprises:

reformatting the account data of the table data structure using a first reformat component to produce first reformatted data;

retrieving data from one or more columns of an input file using the filtered data and the first reformatted data; and extracting a set of fields from the data in the input file.

9. The method of claim 8, wherein the sequence of the plurality of modular operation-specific components further comprises:

reformatting the account data of the second data table structure using a second reformat component to produce second reformatted data;

replicating the second reformatted data using a replicate component to produce first and second copies of the second reformatted data; and joining the first reformatted data and the first copy of the second reformatted data using a first join component to produce the joined data, wherein the updated data is based upon a comparison of the account data associated with the current day in the first reformatted data and the account data associated with the previous day in the first copy of the second reformatted data.

10. The method of claim 9, wherein joining the combined data with a copy of the account data of the table data structure to produce the joined data comprises joining the combined data and the second copy of the second reformatted data using a second join component to produce second joined data.

11. A system, comprising: one or more processors; and a memory coupled to the one or more processors, the memory storing instructions, which when executed by the one or more processors, cause the one or more processors to perform operations comprising:

receiving a data retrieval request specifying:

at least one source database from which to retrieve account data and at least one target database to which to load the account data;

identifying at least one source data type associated with the account data in the at least one source database;

identifying at least one target data type associated with the at least one target database;

determining a particular transformation graph from a library of transformation graphs associated with the at least one source data type and the at least one target data type, the particular transformation comprising a plurality of modular operation-specific components representing a plurality of modular transformation operations;

wherein the particular transformation is configured to transform the account data of the at least one source data type to the at least one target data type;

wherein the plurality of modular operation-specific components are configured to be deployable across a plurality of different types of database infrastructures;

wherein each modular operation-specific component of the plurality of modular operation-specific components comprises a distinct software package configured to perform at least one transformation operation of the plurality of transformation operations;

generating a transformation workflow associated with the data retrieval request based at least in part on the plurality of modular operation-specific components;

wherein the transformation workflow specifies a sequence of the plurality of modular operation-specific components to perform the plurality of transformation operations so as to transform the account data from at least one source data format to the at least one target data format;

determining execution scheduling for each modular operation-specific component of the plurality of modular operation-specific components based at least in part on the transformation workflow;

requesting a cloud-based host system to instantiate a plurality of containers for the plurality of modular operation-specific components, wherein each respective container is configured to establish a separate execution environment with a separate processing thread for each respective modular operation-specific component;

receiving at least one modification to the plurality of modular operation-specific components in the transformation workflow;

modifying at least on modular operation-specific component of the plurality of modular operation specific components while executing the transformation workflow, wherein executing the transformation workflow comprising, at each transformation operation of the plurality of transformation operations in the executing scheduling, invoking, via the cloud-based host system, each respective container to execute each respective modular operation-specific component of the plurality of modular operation-specific components with the at least one modification to cause at least one processing resource to transform the account data of a data table structure as part of the plurality of transformation operations performed by the plurality of modular operation-specific components, wherein the plurality of transformation operations comprises:

identifying updated data based upon a comparison of a first subset of the account data associated with a current day and with a second subset of the account data associated with a previous day;

combining the updated data with new data corresponding to at least one new account to produce combined data; and joining the combined data with a copy of the account data of a second table data structure to produce joined data.

12. The system of claim 11, wherein an execution of the sequence of the plurality of modular operation-specific components is performed as a data pipeline.

13. The system of claim 12, further comprising:

utilizing, by the at least one processor, at least one transformation component to perform the sequence;

wherein each modular operation-specific component is implemented using a python data analysis library, and the table data structure includes a DataFrame object of the python data analysis library.

14. The system of claim 13, wherein the at least one transformation component is implemented as an independent microservice or service.

15. The system of claim 14, wherein each microservice or service is deployed within a container on a host that is remote from the at least one transformation component, and the execution of the at least one transformation component is initiated by an instruction from the system using a communication protocol.

16. The system of claim 11, wherein transforming the data includes the sequence of the plurality of modular operation-specific components comprises:

deduplicating, by a deduplication component, the joined data to remove duplicate records of the joined data associated with the current day and the previous day.

17. The system of claim 11, wherein the sequence of the plurality of modular operation-specific components comprises:

filtering the account data of the first table data structure using a filter component to produce filtered data and rejected data; and writing the rejected data to a reject file.

18. The system of claim 17, wherein the sequence of the plurality of modular operation-specific components comprises:

reformatting the account data of the table data structure using a first reformat component to produce first reformatted data;

retrieving data from one or more columns of an input file using the filtered data and the first reformatted data; and extracting a set of fields from the data in the input file.

19. The system of claim 18, wherein the sequence of the plurality of modular operation-specific components further comprises:

reformatting the account data of the second data table structure using a second reformat component to produce second reformatted data;

replicating the second reformatted data using a replicate component to produce first and second copies of the second reformatted data; and joining the first reformatted data and the first copy of the second reformatted data using a first join component to produce the joined data, wherein the updated data is based upon a comparison of the account data associated with the current day in the first reformatted data and the account data associated with the previous day in the first copy of the second reformatted data.

20. A non-transitory computer-readable medium storing instructions which, when executed by one or more processors of a system, cause the system to perform operations comprising:

receiving a data retrieval request specifying:

at least one source database from which to retrieve account data and at least one target database to which to load the account data;

identifying at least one source data type associated with the account data in the at least one source database;

identifying at least one target data type associated with the at least one target database;

determining a particular transformation graph from a library of transformation graphs associated with the at least one source data type and the at least one target data type, the particular transformation graph comprising a plurality of modular operation-specific components representing a plurality of modular transformation operations;

wherein the particular transformation is configured to transform the account data of the at least one source data type to the at least one target data type;

wherein the plurality of modular operation-specific components are configured to be deployable across a plurality of different types of database infrastructures;

wherein each modular operation-specific component of the plurality of modular operation-specific components comprises a distinct software package configured to perform at least one transformation operation of the plurality of transformation operations;

generating a transformation workflow associated with the data retrieval request based at least in part on the plurality of modular operation-specific components;

wherein the transformation workflow specifies a sequence of the plurality of modular operation-specific components to perform the plurality of transformation operations so as to transform the account data from at least one source data format to the at least one target data format;

determine execution scheduling for each modular operation-specific component of the plurality of modular operation-specific components based at least in part on the transformation workflow;

request a cloud-based host system to instantiate a plurality of containers for the plurality of modular operation-specific components, wherein each respective container is configured to establish a separate execution environment with a separate processing thread for each respective modular operation-specific component;

receiving at least one modification to the plurality of modular operation-specific components in the transformation workflow;

modifying at least on modular operation-specific component of the plurality of modular operation specific components while executing the transformation workflow, wherein executing the transformation workflow comprising, at each transformation operation of the plurality of transformation operations in the executing scheduling, invoking, via the cloud-based host system, each respective container to execute each respective modular operation-specific component of the plurality of modular operation-specific components with the at least one modification to cause at least one processing resource to transform the account data of a data table structure as part of the plurality of transformation operations performed by the plurality of modular operation-specific components, wherein the plurality of transformation operations comprises:

identifying updated data based upon a comparison of a first subset of the account data associated with a current day and with a second subset of the account data associated with a previous day;

combining the updated data with new data corresponding to at least one new account to produce combined data; and joining the combined data with a copy of the account data of a second table data structure to produce joined data.

\* \* \* \* \*